US011871792B2

(12) United States Patent
Kane

(10) Patent No.: US 11,871,792 B2
(45) Date of Patent: *Jan. 16, 2024

(54) E-VAPING CARTRIDGE AND DEVICE

(71) Applicant: Altria Client Services LLC, Richmond, VA (US)

(72) Inventor: David Kane, Richmond, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,134

(22) Filed: May 25, 2022

(65) Prior Publication Data

US 2022/0279858 A1 Sep. 8, 2022

Related U.S. Application Data

(60) Division of application No. 16/291,218, filed on Mar. 4, 2019, now Pat. No. 11,344,065, which is a (Continued)

(51) Int. Cl.

*A24F 40/485* (2020.01)
*H05B 3/00* (2006.01)

(Continued)

(52) U.S. Cl.

CPC ......... *A24F 40/485* (2020.01); *H05B 3/0014* (2013.01); *H05B 3/56* (2013.01); *A24F 40/10* (2020.01)

(58) Field of Classification Search

None

See application file for complete search history.

(56) References Cited

U.S. PATENT DOCUMENTS 2,558,127 A * 6/1951 Downs .................. A24D 1/042 131/363
3,693,884 A * 9/1972 Snodgrass ............ A62C 3/0207 239/432

(Continued)

FOREIGN PATENT DOCUMENTS

EP 2606756 A1 6/2013
JP 2015-506182 A 3/2015

(Continued)

OTHER PUBLICATIONS

Christopher J Brown and James M Cheng "Electronic Cigarettes: Product Characterisation and Design Considerations" May 2014, Tobacco Control 2014.

(Continued)

*Primary Examiner* — Thor S Campbell

(74) *Attorney, Agent, or Firm* — Harness, Dickey & Pierce, P.L.C.

(57) ABSTRACT

Example embodiments relate to a cartridge including a housing, a pre-vapor formulation reservoir configured to store a pre-vapor formulation in the housing, a vaporizer, and an airflow diverter. The vaporizer may be configured to vaporize the pre-vapor formulation. The vaporizer may include a heater and a wick, the wick may be in fluid communication with the pre-vapor formulation reservoir, and the heater may be configured to vaporize at least a portion of the pre-vapor formulation in the wick to form a vapor. The heater may be positioned in a transverse direction in the housing, and the airflow diverter may be located on an opposite side of the heater relative to a mouth-end portion.

20 Claims, 8 Drawing Sheets

Related U.S. Application Data continuation of application No. 15/066,588, filed on Mar. 10, 2016, now Pat. No. 10,258,087.

(51) Int. Cl.
*H05B 3/56* (2006.01)
*A24F 40/10* (2020.01)

(56) References Cited

U.S. PATENT DOCUMENTS 4,655,229 A * 4/1987 Sensabaugh, Jr. ...... A24F 42/60
131/273
5,403,522 A * 4/1995 Von Berg .......... B01F 25/31242
261/36.1
6,810,883 B2 11/2004 Felter et al.
6,854,470 B1 * 2/2005 Pu .......................... A24F 42/20
131/276
6,948,908 B2 9/2005 Jung et al.
7,726,320 B2 * 6/2010 Robinson ............... A24B 13/02
131/194
7,913,688 B2 * 3/2011 Cross ................... A61M 11/002
128/203.26
8,499,766 B1 * 8/2013 Newton .................. A24F 40/51
131/273
8,528,569 B1 * 9/2013 Newton ................ A61M 15/06
131/194
8,550,068 B2 10/2013 Terry et al.
8,678,012 B2 * 3/2014 Li .......................... A24F 40/46
131/273
8,833,364 B2 9/2014 Buchberger
9,510,623 B2 * 12/2016 Tucker .................. A24F 40/485
9,603,386 B2 * 3/2017 Xiang ..................... A24F 40/50
9,648,908 B1 * 5/2017 Rinehart ................. A24F 40/40
9,675,114 B2 * 6/2017 Timmermans .......... A24F 40/60
9,808,032 B2 * 11/2017 Yamada ............... A61M 11/042
9,861,135 B2 * 1/2018 Chen ....................... A24F 40/44
10,258,087 B2 4/2019 Kane
2007/0283972 A1 * 12/2007 Monsees ................. F23Q 3/002
131/273
2009/0095287 A1 * 4/2009 Emarlou ............... A61M 15/06
128/200.14
2010/0313901 A1 * 12/2010 Fernando ........... B65D 85/1081
131/330
2011/0036346 A1 * 2/2011 Cohen ..................... A24F 40/60
128/200.14
2011/0094523 A1 * 4/2011 Thorens ............... A61M 11/042
131/194
2011/0265806 A1 * 11/2011 Alarcon .................. A24F 47/00
131/273
2011/0303231 A1 * 12/2011 Li .......................... A24F 40/42
131/329
2012/0048266 A1 * 3/2012 Alelov ............. A61M 15/0066
128/203.14
2012/0111347 A1 5/2012 Hon
2012/0199663 A1 * 8/2012 Qiu ......................... A24F 40/42
239/8
2012/0260927 A1 * 10/2012 Liu ......................... A24F 40/46
219/525
2012/0285475 A1 * 11/2012 Liu ......................... A24F 40/46
131/329
2013/0042865 A1 * 2/2013 Monsees .................. G08B 5/36
128/203.27
2013/0104916 A1 * 5/2013 Bellinger ............. A61M 11/042
131/328
2013/0139833 A1 * 6/2013 Hon ........................ F22B 1/284
131/273
2013/0192622 A1 * 8/2013 Tucker ..................... H05B 3/12
131/329
2013/0192623 A1 8/2013 Tucker et al.
2013/0213419 A1 * 8/2013 Tucker .................... A24F 40/46
131/328
2013/0228191 A1 * 9/2013 Newton ................ A61M 15/06
131/329
2013/0284192 A1 * 10/2013 Peleg ...................... A24F 40/65
131/329
2013/0319440 A1 * 12/2013 Capuano ................ A24F 40/50
131/329
2013/0340775 A1 * 12/2013 Juster ...................... A24F 40/65
131/273
2014/0053856 A1 * 2/2014 Liu ........................ A24F 40/51
131/329
2014/0107815 A1 * 4/2014 LaMothe ................ A24F 15/01
700/90
2014/0123989 A1 * 5/2014 LaMothe .......... A61M 15/0003
131/328
2014/0123990 A1 * 5/2014 Timmermans .......... A24F 40/60
131/328
2014/0144429 A1 5/2014 Wensley et al.
2014/0174458 A1 6/2014 Katz
2014/0174459 A1 * 6/2014 Burstyn .................. A24F 40/60
131/273
2014/0190496 A1 7/2014 Wensley et al.
2014/0202472 A1 7/2014 Levitz et al.
2014/0209110 A1 * 7/2014 Hon .................... H01M 50/247
131/329
2014/0246035 A1 * 9/2014 Minskoff ................ A24F 40/65
131/329
2014/0251324 A1 * 9/2014 Xiang ..................... A24F 40/50
128/202.21
2014/0261492 A1 9/2014 Kane et al.
2014/0283858 A1 9/2014 Liu
2014/0305820 A1 * 10/2014 Xiang ..................... A24F 40/95
206/236
2014/0334804 A1 * 11/2014 Choi ..................... A24F 40/485
392/404
2014/0360512 A1 * 12/2014 Xiang ..................... A24F 40/50
131/328
2015/0027470 A1 1/2015 Kane et al.
2015/0047662 A1 * 2/2015 Hopps .................. A61M 15/06
392/394
2015/0053217 A1 * 2/2015 Steingraber ............ A24F 40/50
131/329
2015/0075546 A1 * 3/2015 Kueny, Sr. .............. A24F 40/65
700/299
2015/0122252 A1 * 5/2015 Frija ....................... A24F 40/65
128/202.21
2015/0173124 A1 * 6/2015 Qiu ......................... A24F 40/60
131/328
2015/0208731 A1 7/2015 Malamud et al.
2015/0224268 A1 * 8/2015 Henry ..................... A24F 40/53
128/202.21
2015/0237917 A1 * 8/2015 Lord ....................... G01L 19/04
131/328
2015/0245661 A1 * 9/2015 Milin ...................... A24F 40/40
131/329
2015/0257445 A1 * 9/2015 Henry, Jr. ............... A24F 40/53
131/328
2015/0257448 A1 * 9/2015 Lord ....................... A24F 40/60
700/90
2015/0258289 A1 * 9/2015 Henry, Jr. ............... A24F 40/50
128/202.21
2015/0288468 A1 * 10/2015 Xiang ..................... A24F 40/65
455/500
2015/0357839 A1 * 12/2015 Cai ......................... A24F 40/53
131/329
2015/0359263 A1 * 12/2015 Bellinger ............. H05B 1/0244
392/394
2016/0007651 A1 * 1/2016 Ampolini ................ H04L 67/10
131/328
2016/0021930 A1 * 1/2016 Minskoff ................ A24F 40/51
392/395
2016/0106156 A1 * 4/2016 Qiu ......................... A24F 40/53
392/404
2016/0198772 A1 7/2016 Thorens et al.
2016/0219938 A1 * 8/2016 Mamoun ................ G05B 15/02
2016/0285983 A1 * 9/2016 Liu ........................ G16H 40/67
2016/0324216 A1 11/2016 Li et al.
2016/0331024 A1 * 11/2016 Cameron ................ A24F 40/50
2016/0331026 A1 * 11/2016 Cameron ................ A24F 40/50

(56) References Cited

U.S. PATENT DOCUMENTS

| | | | | |
|---|---|---|---|---|
| 2016/0331027 | A1* | 11/2016 | Cameron | B05B 15/40 |
| 2016/0331035 | A1* | 11/2016 | Cameron | H04M 1/21 |
| 2016/0331039 | A1 | 11/2016 | Thorens et al. | |
| 2016/0331859 | A1* | 11/2016 | Cameron | A24F 40/51 |
| 2016/0337362 | A1* | 11/2016 | Cameron | G06Q 20/3278 |
| 2016/0338407 | A1* | 11/2016 | Kerdemelidis | A24F 40/60 |
| 2016/0345628 | A1* | 12/2016 | Sabet | H04M 1/21 |
| 2016/0360786 | A1* | 12/2016 | Bellinger | A24F 40/46 |
| 2016/0363917 | A1* | 12/2016 | Blackley | G06F 3/0488 |
| 2016/0374401 | A1* | 12/2016 | Liu | A24F 40/50 131/328 |
| 2017/0035110 | A1 | 2/2017 | Keen | |
| 2017/0042230 | A1* | 2/2017 | Cameron | A24F 40/60 |
| 2017/0042231 | A1* | 2/2017 | Cameron | A24F 40/65 |
| 2017/0045994 | A1* | 2/2017 | Murison | H02J 7/342 |
| 2017/0046357 | A1* | 2/2017 | Cameron | A24F 40/30 |
| 2017/0046738 | A1* | 2/2017 | Cameron | A24F 40/65 |
| 2017/0055588 | A1* | 3/2017 | Cameron | A61M 15/06 |
| 2017/0064999 | A1* | 3/2017 | Perez | H05B 1/0244 |
| 2017/0079327 | A1* | 3/2017 | Wu | H05B 1/0244 |
| 2017/0079329 | A1* | 3/2017 | Zitzke | H05B 1/0225 |
| 2017/0086496 | A1* | 3/2017 | Cameron | B25F 1/04 |
| 2017/0086497 | A1* | 3/2017 | Cameron | H05B 1/0244 |
| 2017/0086503 | A1* | 3/2017 | Cameron | A24F 40/90 |
| 2017/0086504 | A1* | 3/2017 | Cameron | A24F 40/48 |
| 2017/0086505 | A1* | 3/2017 | Cameron | H01L 29/78693 |
| 2017/0086507 | A1* | 3/2017 | Rado | H05B 3/44 |
| 2017/0091490 | A1* | 3/2017 | Cameron | G06F 21/84 |
| 2017/0092106 | A1* | 3/2017 | Cameron | A24F 40/65 |
| 2017/0093960 | A1* | 3/2017 | Cameron | H04W 4/80 |
| 2017/0093981 | A1* | 3/2017 | Cameron | A24F 40/65 |
| 2017/0119058 | A1* | 5/2017 | Cameron | A24B 15/167 |
| 2017/0127727 | A1* | 5/2017 | Davidson | A61P 13/10 |
| 2017/0135400 | A1* | 5/2017 | Liu | A24F 40/53 |
| 2017/0135407 | A1* | 5/2017 | Cameron | A24F 40/60 |
| 2017/0135408 | A1* | 5/2017 | Cameron | A24F 40/51 |
| 2017/0135409 | A1* | 5/2017 | Cameron | A24F 1/02 |
| 2017/0135410 | A1* | 5/2017 | Cameron | H01M 10/44 |
| 2017/0135411 | A1* | 5/2017 | Cameron | A24F 40/50 |
| 2017/0135412 | A1* | 5/2017 | Cameron | A24F 40/51 |
| 2017/0136193 | A1* | 5/2017 | Cameron | A24F 40/48 |
| 2017/0136194 | A1* | 5/2017 | Cameron | A24F 40/05 |
| 2017/0136301 | A1* | 5/2017 | Cameron | A24F 40/65 |
| 2017/0143917 | A1* | 5/2017 | Cohen | A24F 40/40 |
| 2017/0150756 | A1* | 6/2017 | Rexroad | H05B 1/0244 |
| 2017/0157341 | A1* | 6/2017 | Pandya | A61M 15/009 |
| 2017/0181467 | A1* | 6/2017 | Cameron | A63F 13/98 |
| 2017/0181474 | A1* | 6/2017 | Cameron | A24B 15/167 |
| 2017/0181475 | A1* | 6/2017 | Cameron | A24F 40/53 |
| 2017/0185364 | A1* | 6/2017 | Cameron | G09G 5/12 |
| 2017/0196270 | A1* | 7/2017 | Vick | H02J 7/0042 |
| 2017/0208867 | A1* | 7/2017 | Li | G08C 17/02 |
| 2017/0215480 | A1* | 8/2017 | Qiu | A24F 40/65 |
| 2017/0224020 | A1* | 8/2017 | Fernando | H02J 7/0013 |
| 2017/0231280 | A1* | 8/2017 | Anton | A24F 40/65 392/404 |
| 2017/0245550 | A1* | 8/2017 | Freelander | A61M 15/0051 |
| 2017/0245554 | A1* | 8/2017 | Perez | A24F 40/40 |
| 2017/0258136 | A1* | 9/2017 | Hawes | G08C 17/02 |
| 2017/0258142 | A1* | 9/2017 | Hatton | H05B 1/0244 |
| 2017/0259170 | A1* | 9/2017 | Bowen | A24F 40/60 |
| 2017/0273357 | A1* | 9/2017 | Barbuck | H05B 3/04 |
| 2017/0280779 | A1* | 10/2017 | Qiu | G05D 23/1919 |
| 2017/0290998 | A1* | 10/2017 | Poston | A61M 11/047 |
| 2017/0295844 | A1* | 10/2017 | Thevenaz | A24F 40/46 |
| 2017/0303590 | A1* | 10/2017 | Cameron | A24F 40/00 |
| 2017/0303593 | A1* | 10/2017 | Cameron | A24F 40/60 |
| 2017/0303594 | A1* | 10/2017 | Cameron | A61M 15/00 |
| 2017/0309091 | A1* | 10/2017 | Cameron | G07C 5/085 |
| 2017/0332702 | A1* | 11/2017 | Cameron | A24F 40/65 |
| 2022/0279858 | A1* | 9/2022 | Kane | H05B 3/56 |

FOREIGN PATENT DOCUMENTS

| | | | |
|---|---|---|---|
| RU | 150594 | U1 | 2/2015 |
| WO | WO-2011/146372 | A2 | 11/2011 |
| WO | WO-2012/129812 | A1 | 10/2012 |
| WO | WO-2013/083638 | A1 | 6/2013 |
| WO | WO-2014/046993 | A1 | 3/2014 |
| WO | WO-2014/150573 | A2 | 9/2014 |
| WO | WO-2016/179376 | A1 | 11/2016 |
| WO | WO-2017/021550 | A1 | 2/2017 |

OTHER PUBLICATIONS

International Search Report and Written Opinion dated Jun. 30, 2017 issued in International Application No. PCT/EP2017/0557456.

Decision to Grant and search report dated May 18, 2020, issued in corresponding Russian Patent Application No. 2018135549/03(058525).

Office Action dated Nov. 13, 2020 in Chinese Application No. 201780011921.X.

Office Action dated Apr. 1, 2021 issued in corresponding Japanese Patent Application No. 2018-547889.

Decision to Grant dated Sep. 29, 2021, issued in corresponding Japanese Patent Application No. 2018-547889.

Notice of Allowance dated Feb. 23, 2022, issued in corresponding Korean Patent Application No. 10-2018-7024356.

* cited by examiner

E-VAPING CARTRIDGE AND DEVICE

CROSS-REFERENCE TO RELATED APPLICATION

This application is a divisional of U.S. application Ser. No. 16/291,218, filed on Mar. 4, 2019, which is a continuation of U.S. application Ser. No. 15/066,588, filed on Mar. 10, 2016, the entire disclosure of each of which is incorporated herein by reference.

BACKGROUND

Field

The present disclosure relates to an electronic vaping or e-vaping device operable to deliver pre-vapor formulation from a supply source to a vaporizor.

Description of Related Art

An e-vaping device includes a heater element which vaporizes pre-vapor formulation to produce a "vapor." The heater element includes a resistive heater coil, with a wick extending therethrough.

Electronic vaping devices are used to vaporize a pre-vapor formulation into a "vapor" such that the vapor may be drawn through an outlet of the electronic vaping device. These electronic vaping devices may be referred to as e-vaping devices. E-vaping devices may include a heater which vaporizes pre-vapor formulation to produce an aerosol. An e-vaping device may include several e-vaping elements including a power source, a cartridge or e-vaping tank including the heater, and a reservoir capable of holding the pre-vapor formulation. The heater further includes a resistive heater coil, with a wick extending therethrough, contained in the cartridge. When the vapor is drawn through an outlet of the device, air in the cartridge passes over the heater-wick assembly, which may reduce the energy consumption of the device due to the lost energy of air passing therethrough. Air passing over the heater-wick assembly will be heated to the temperature of the wick by convection and conduction. The energy that it takes to heat this air will not be available for vaporizing the pre-vapor formulation. Therefore, more total energy is required for vaporizing the pre-vapor formulation. The heating of the air passing over the heater-wick assembly may also lead to higher vapor temperatures at the outlet of the device.

SUMMARY

Example embodiments relate to a cartridge of an e-vaping device and an e-vaping device.

In one example embodiment, the cartridge includes a housing, a pre-vapor formulation reservoir in the housing, the pre-vapor formulation reservoir configured to store a pre-vapor formulation, a vaporizer configured to vaporize the pre-vapor formulation, the vaporizer including a heater and a wick, the wick being in fluid communication with the pre-vapor formulation reservoir, and the heater configured to vaporize at least a portion of the pre-vapor formulation in the wick to form a vapor, and an airflow diverter. The heater may be positioned in a transverse direction in the housing, and the airflow diverter may be located on an opposite side of the heater relative to a mouth-end portion.

In an example embodiment, the airflow diverter may be substantially V-shaped in a cross-section along a longitudinal axis of the e-vapor device.

In an example embodiment, the airflow diverter may be substantially C-shaped in a cross-section along a longitudinal axis of the e-vapor device.

In an example embodiment, the housing further may include an outer tube and an inner tube within the outer tube. The inner tube may include a pair of opposing slots, and an end portion of the vaporizer may extend through one of the opposing slots.

In yet a further example embodiment, the airflow diverter may divert air outwardly towards the inner tube.

In an example embodiment, the cartridge may further include at least one air inlet located on an outer surface of the outer tube.

In yet a further example embodiment, the at least one air inlet may be near the mouth-end portion.

In yet a further example embodiment, the at least one air inlet may be at end of the fluid reservoir closest to the mouth-end portion.

In yet a further example embodiment, the at least one air inlet may be disposed transversely in relation to an airflow directed to the mouth-end portion.

In yet a further example embodiment, the at least one air inlet may be disposed at an angle in relation to an airflow directed to the mouth-end portion.

In yet a further example embodiment, the at least one air inlet may be disposed at a 45 degree angle in relation to an airflow directed to the mouth-end insert.

In other example embodiment, an e-vaping device may include a cartridge and a power supply configured to supply power to the heater. The cartridge may include a housing, a pre-vapor formulation reservoir in the housing, the pre-vapor formulation reservoir configured to store a pre-vapor formulation, a vaporizer configured to vaporize the pre-vapor formulation, the vaporizer including a heater and a wick, the wick being in fluid communication with the pre-vapor formulation reservoir, and the heater configured to vaporize at least a portion of the pre-vapor formulation in the wick to form a vapor, and an airflow diverter. The heater may be positioned in a transverse direction in the housing, and the airflow diverter may be located on an opposite side of the heater relative to a mouth-end portion.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
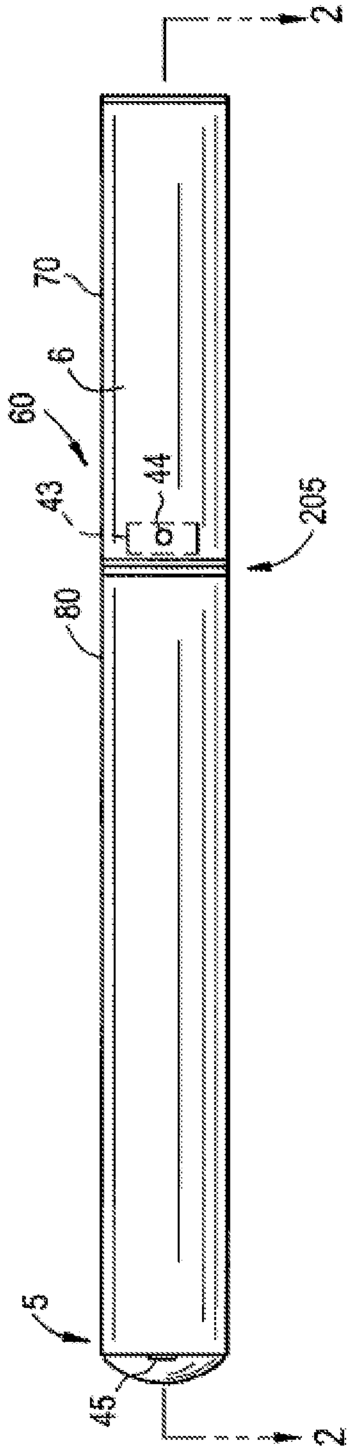
FIG. 1 is a planar view of an e-vaping device according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shaped of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
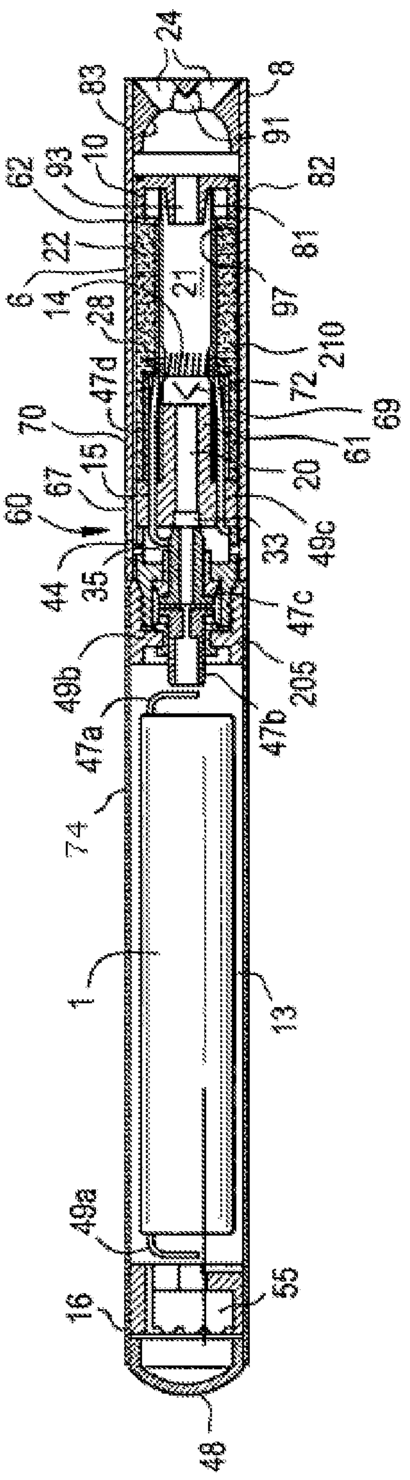
FIG. 2 is a side cross-sectional view of the e-vaping device shown in FIG. 1.

Referring to FIGS. 1 and 2, an e-vaping device 60 may include a replaceable cartridge (or first section) 70 and a reusable fixture (or second section) 80, which may be coupled together at a threaded connection 205. It should be appreciated that other couplers such as a snug-fit, detent, clamp, and/or clasp may be used to couple the first section 70 and the second section 80. The second section 80 may include a puff sensor 16 responsive to air drawn into the second section 80 via an air inlet port 45 adjacent a free-end or tip of the e-vaping device 60, a battery 1, and control circuit 55. The first section 70 may include a pre-vapor formulation supply region 22 for a pre-vapor formulation and a heater 14 that may vaporize the pre-vapor formulation, which may be drawn from the pre-vapor formulation supply region 22 through a wick 28. Upon completing the threaded connection 205, the battery 1 may be electrically connectable with the heater 14 of the first section 70 upon actuation of the puff sensor 16. Air is drawn primarily into the first section 70 through one or more air inlets 44.

The first section 70 may include a mouth-end insert 8 having at least two diverging outlet passages 24 (e.g., preferably two to six outlet passages 24, more preferably 4 outlet passages 24). The outlet passages 24 may be located off-axis and may be angled outwardly in relation to a central channel 21 of an inner tube 62 (i.e., divergently). In an alternative embodiment, the mouth-end insert 8 may include outlet passages 24 uniformly distributed about the perimeter of the mouth-end insert 8 so as to substantially uniformly distribute vapor output from the mouth-end insert 8. Thus, as the vapor is drawn through the mouth-end insert 8, the vapor may enter the mouth and may move in different directions so as to provide a full mouth feel. In contrast, e-vaping devices having a single, on-axis orifice tend to direct its vapor as single jet of greater velocity toward a more limited location.

In addition, the diverging outlet passages 24 may include interior surfaces 83 such that droplets of un-vaporized pre-vapor formulation, if any, may be entrained in the interior surfaces 83 of the mouth-end insert 8 and/or portions of walls which define the diverging outlet passages 24. As a result such droplets may be substantially removed or broken apart, so as to enhance the vapor.

In an example embodiment, the diverging outlet passages 24 may be angled at about 5° to about 60° with respect to the longitudinal axis of the outer tube 6 so as to more completely and/or uniformly distribute vapor drawn through the mouth-end insert 8 and to remove droplets. In yet another example embodiment, there may be four diverging outlet passages 24 each at an angle of about 40° to about 50° with respect to the longitudinal axis of the outer tube 6, more preferably about 40° to about 45° and most preferably about 42°. In yet another example embodiment, at the convergence of the diverging outlet passages 24 within the mouth-end insert 8, a hollow member 91 may be disposed therein.

In an example embodiment, each of the diverging outlet passages 24 may have a diameter ranging from about 0.015 inch to about 0.090 inch (e.g., about 0.020 inch to about 0.040 inch or about 0.028 inch to about 0.038 inch). The size of the diverging outlet passages 24 and the number of diverging outlet passages 24 can be selected to adjust the resistance-to-draw (RTD) of the e-vaping device 60, if desired.

The first section 70 may include an outer tube (or housing) 6 extending in a longitudinal direction and an inner tube (or chimney) 62 coaxially positioned within the outer tube 6. At a first end portion of the inner tube 62, a nose portion 61 of a gasket (or seal) 15 may be fitted into the inner tube 62, while at the other end, an outer perimeter 67 of the gasket 15 may provide a liquid-tight seal with an interior surface of the outer tube 6. The gasket 15 may also include a central, longitudinal air passage 20, which opens into an interior of the inner tube 62 that defines a central channel. A transverse channel 33 at a backside portion of the gasket 15 may intersect and communicate with the central channel 20 of the gasket 15. This transverse channel 33 assures communication between the central channel 20 and a space 35 defined between the gasket 15 and a cathode connector piece 37.

Figure 3:
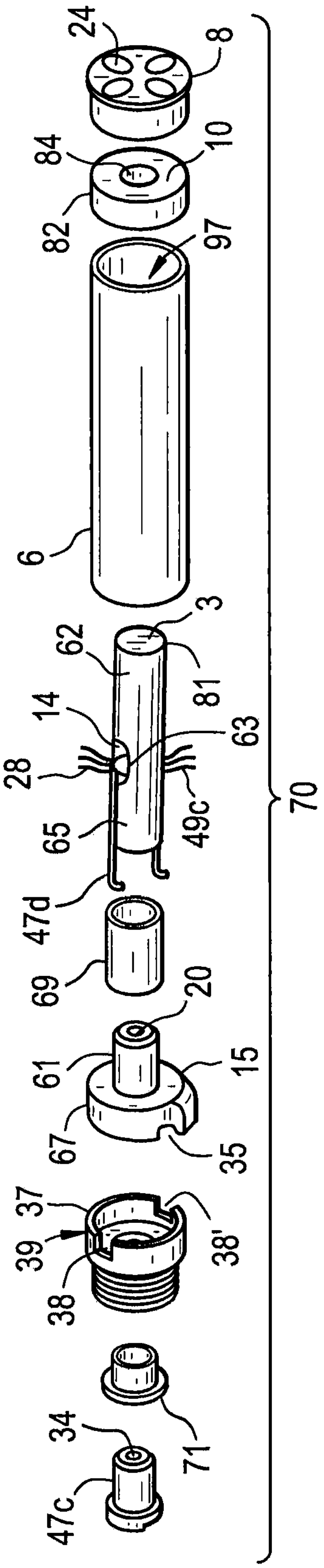
FIG. 3 is an exploded, perspective view of elements including a cartridge section of the e-vaping device shown in FIG. 1.

Referring to FIG. 3, the cathode connector piece 37 may include a threaded section for effecting the threaded connection 205. The cathode connector piece 37 may include opposing notches 38, 38' about its perimeter 39, which, upon insertion of the cathode connector piece 37 into the outer tube 6, may be aligned with the location of each of two resistance-to-draw (RTD) controlling, air inlet ports 44 in the outer tube 6. It should be appreciated that more than two air inlet ports 44 may be included in the outer tube 6. Alternatively, a single air inlet port 44 may be included in the outer tube 6. Such arrangement allows for placement of the air inlet ports 44 relatively close to the threaded connection 205 without occlusion by the presence of the cathode connector piece 37. This arrangement may also reinforce the area of air inlet ports 44 to facilitate more precise drilling of the air inlet ports 44.

Referring back to FIG. 1, in an example embodiment, at least one air inlet port 44 may be formed in the outer tube 6, adjacent the threaded connection 205 to suppress and/or minimize the chance of an adult vaper's fingers occluding one of the ports and to control the resistance-to-draw (RTD) during vaping. In an example embodiment, the air inlet ports 44 may be machined into the outer tube 6 with precision tooling such that their diameters are closely controlled and replicated from one e-vaping device 60 to the next during manufacture.

In a further example embodiment, the air inlet ports 44 may be drilled with carbide drill bits or other high-precision tools and/or techniques. In yet a further example embodiment, the outer tube 6 may be formed of metal or metal alloys such that the size and shaped of the air inlet ports 44 may not be altered during manufacturing operations, packaging, and/or vaping. Thus, the air inlet ports 44 may provide more consistent RTD. In yet a further example embodiment, the air inlet ports 44 may be sized and configured such that the e-vaping device 60 has a RTD in the range of from about 60 mm $H_2O$ to about 150 mm $H_2O$, more preferably about 90 mm $H_2O$ to about 110 mm $H_2O$, most preferably about 100 mm $H_2O$ to about 130 mm $H_2O$.

During the RTD controlling, the air inlet ports 44 may be a relatively critical orifice (e.g., the smallest orifice along the pathway from the air inlets 44 and the inner passage 21 of the inner tube 62, where the heater 14 vaporizes the pre-vapor formulation. Accordingly, the air inlet ports 44 may control the level of RTD of the e-vaping device 60.

In another example embodiment, if another material is desired for the outer tube 6 (such as a plastic for presenting a softer feel), the air inlet ports 44 may be instead formed in a metallic plate fixture (or insert) 43 provided at the location of the air inlets 44 so as to maintain the precision of the air inlets 44.

Referring to FIG. 2, a nose portion 93 of a gasket 10 may be fitted into a second end portion 81 of the inner tube 62. An outer perimeter 82 of the gasket 10 may provide a substantially liquid-tight seal with an interior surface 97 of the outer tube 6. The gasket 10 may include a central channel 84 disposed between the central passage 21 of the inner tube 62 and the interior of the mouth-end insert 8, which may transport the vapor from the central passage 21 to the mouth-end insert 8.

The space defined between the gaskets 10 and 15 and the outer tube 6 and the inner tube 62 may establish the confines of a pre-vapor formulation supply region 22. The pre-vapor formulation supply region 22 may include a pre-vapor formulation, and optionally a pre-vapor formulation storage medium 210 operable to store the pre-vapor formulation therein. The pre-vapor formulation storage medium 210 may include a winding of cotton gauze or other fibrous material about the inner tube 62.

The pre-vapor formulation may include one or more vapor formers, water, one or more "flavorants" (a compound providing flavor/aroma), and nicotine. For instance, the pre-vapor formulation may include a tobacco-containing material including volatile tobacco flavor compounds which are released from the pre-vapor formulation upon heating. The pre-vapor formulation may also be a tobacco flavor containing material or a nicotine-containing material. Alternatively, or in addition, the pre-vapor formulation may include a non-tobacco material(s). For example, the pre-vapor formulation may include water, solvents, active ingredients, ethanol, plant extracts and natural or artificial flavors. The pre-vapor formulation may further include a vapor former. Examples of suitable vapor formers are glycerine, diols (such as propylene glycol and/or 1,3-propanediol), etc. Because of the diversity of suitable pre-vapor formulation, it should be understood that these various pre-vapor formulations may include varying physical properties, such as varying densities, viscosities, surface tensions and vapor pressures.

The pre-vapor formulation supply region 22 may be contained in an outer annulus between the inner tube 62 and the outer tube 6 and between the gaskets 10 and 15. Thus, the pre-vapor formulation supply region 22 may at least partially surround the central air passage 21. The heater 14 may extend transversely across the central channel 21 between opposing portions of the pre-vapor formulation supply region 22.

The pre-vapor formulation supply region 22 may be sized and configured to hold enough pre-vapor formulation such that the e-vaping device 60 may be operable for vaping for at least about 200 seconds, preferably at least about 250 seconds, more preferably at least 300 seconds and most preferably at least about 350 seconds. Moreover, the e-vaping device 60 may be configured to allow each application of negative pressure to last a maximum of about 5 seconds.

The pre-vapor formulation storage medium 210 may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The pre-vapor formulation storage medium 210 may be a sintered, porous or foamed material. Also, the fibers may be sized to be irrespirable and can have a cross-section which has a Y-shape, cross shape, clover shape or any other suitable shape. In an alternative embodiment, the pre-vapor formulation supply region 22 may include a filled tank lacking any fibrous storage medium 210 and containing only liquid material.

Figure 4:
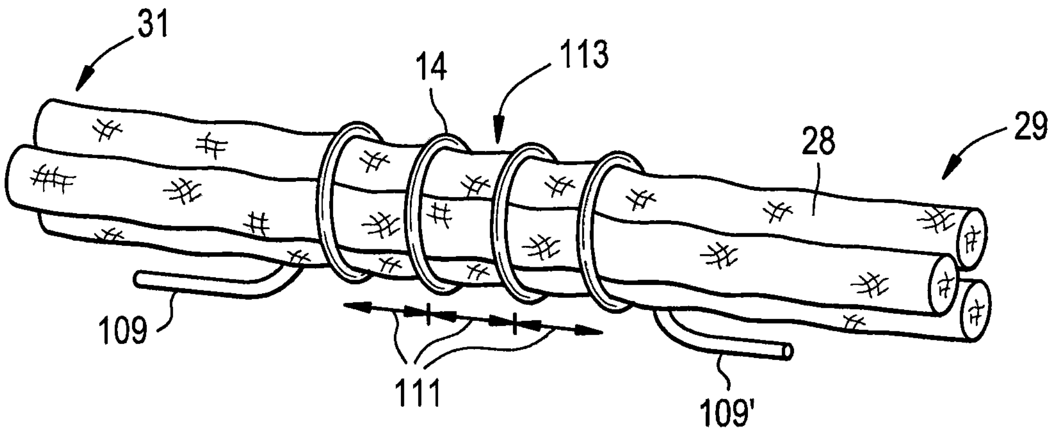
FIG. 4 is an enlarged detail view of a heater assembly of the e-vaping device shown in FIG. 1.
Figure 5:
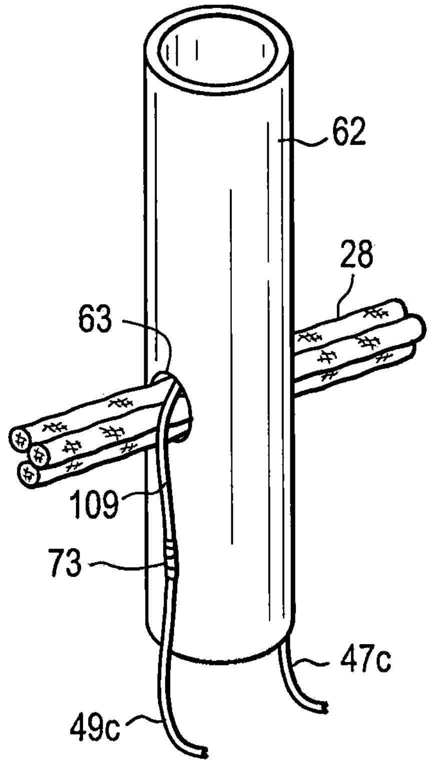
FIG. 5 is an enlarged view of an inner tube with a heater coil and wick assembly shown in FIG. 1.

The pre-vapor formulation may be transferred from the pre-vapor formulation supply region 22 and/or pre-vapor formulation storage medium 210 in the proximity of the heater 14 via capillary action of the wick 28. As shown in FIG. 4, the wick 28 may include a first end portion 29 and a second end portion 31. The first end portion 29 and the second end portion 31 may extend into opposite sides of the pre-vapor formulation storage medium 21 for contact with the pre-vapor formulation contained therein. More specifically, the wick 28 may extend through opposed slots 63 (as shown in FIG. 5) in the inner tube 62 such that each end of the wick 28 may be in contact with the pre-vapor formulation supply region 22. The heater 14 may at least partially surround a central portion 113 of the wick 28 such that when the heater 14 is activated, the pre-vapor formulation in the central portion 113 of the wick 28 may be vaporized by the heater 14 to form a vapor.

The wick 28 may include filaments (or threads) having a capacity to draw a pre-vapor formulation. For example, the wick 28 may be a bundle of glass (or ceramic) filaments, a bundle including a group of windings of glass filaments, etc., all of which arrangements may be capable of drawing pre-vapor formulation via capillary action by interstitial spacings between the filaments. The filaments may be generally aligned in a direction perpendicular (transverse) to the longitudinal direction of the e-vaping device 60. In an example embodiment, the wick 28 may include one to eight filament strands, preferably two to six filament strands, and most preferably three filament strands, each strand comprising a plurality of glass filaments twisted together. Moreover, it should be appreciated that the end portions of the 29 and 31 of the wick 28 may be flexible and foldable into the confines of the pre-vapor formulation supply region 22.

The wick 28 may include any suitable material or combination of materials. Examples of suitable materials may be, but not limited to, glass, ceramic- or graphite-based materials. Moreover, the wick 28 may have any suitable capillarity drawing action to accommodate pre-vapor formulations having different physical properties such as density, viscosity, surface tension and vapor pressure. The capillary properties of the wick 28, combined with the properties of the pre-vapor formulation, ensure that the wick 28 may always be wet in the area of the heater 14 so as to avoid overheating of the heater 14.

Referring to FIG. 4, the heater 14 may include a wire coil which at least partially surrounds the wick 28. The wire may be a metal wire and/or the heater coil may extend fully or partially along the length of the wick 28. The heater coil may further extend fully or partially around the circumference of the wick 28. It should be appreciated that the heater coil may or may not be in contact with the wick 28.

The heater coil may be formed of any suitable electrically resistive materials. Examples of suitable electrically resistive materials may include, but are not limited to, titanium, zirconium, tantalum and metals from the platinum group. Examples of suitable metal alloys include, but not limited to, stainless steel, nickel, cobalt, chromium, aluminium-titanium-zirconium, hafnium, niobium, molybdenum, tantalum, tungsten, tin, gallium, manganese and iron-containing alloys, and super-alloys based on nickel, iron, cobalt, stainless steel. For example, the heater 14 can be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heater 14 may include at least one material selected from the group consisting of stainless steel, copper, copper alloys, nickel-chromium alloys, super alloys and combinations thereof. In an example embodiment, the heater 14 may be formed of nickel-chromium alloys or iron-chromium alloys. In another example embodiment, the heater 14 can be a ceramic heater having an electrically resistive layer on an outside surface thereof.

The heater 14 may heat pre-vapor formulation in the wick 28 by thermal conduction. Alternatively, heat from the heater 14 may be conducted to the pre-vapor formulation by a heat conductive element, or the heater 14 may transfer heat to the incoming ambient air that is drawn through the e-vaping device 60 when negative pressure is applied, which in turn heats the pre-vapor formulation by convection.

It should be appreciated that, instead of using a wick 28, the heater 14 can be a porous material which incorporates a resistance heater formed of a material having a relatively high electrical resistance capable of generating heat quickly.

In another example embodiment, the wick 28 and the fibrous medium of the pre-vapor formulation supply region 22 may be constructed from fiberglass.

Referring back to FIG. 2, the power supply 1 may include a battery arranged in the e-vaping device 60 such that the anode 47*a* may be located closer to the threaded connection 205 than the cathode 49*a*. When included, a battery anode post 47*b* of the second section 80 may contact the battery anode 47*a*. More specifically, electrical connection between the anode 47*a* of the battery 1 and the heater 14 (heater coil) in the first section 70 may be established through a battery anode connection post 47*b* in the second section 80 of the e-vaping device 60, an anode post 47*c* of the cartridge 70 and an electrical lead 47*d* connecting a rim portion of the anode post 47*c* with an electrical lead 109 of the heater 14. Likewise, electrical connection between the cathode 49*a* of the battery 1 and the other lead 109' (shown in FIG. 4) of the heater coil may be established through the threaded connection 205 between a cathode connection fixture 49*b* of the second portion 74 and the cathode connector piece 37 of the first section 70; and from there through an electrical lead 49*c* which electrically connects the fixture 37 to the opposite lead 109' of the heater 14.

The electrical leads 47*d*, 49*c* and the heater leads 109, 109' may be highly conductive and temperature resistant while the coiled section of the heater 14 is highly resistive so that heat generation occurs primarily along the coils of the heater 14. The electrical lead 47*d* may be connected to the heater lead 109 by crimping, for example. Likewise, the electrical lead 49*c* may be connected to the heater lead 109' by crimping, for example. In alternative embodiments, the electrical leads 47*d*, 49*c* can be attached to the heater leads 109, 109' via brazing, spot welding and/or soldering.

The power supply 1 may be a Lithium-ion battery or one of its variants, for example a Lithium-ion polymer battery. Alternatively, the power supply 1 may be a nickel-metal hydride battery, a nickel cadmium battery, a lithium-manganese battery, a lithium-cobalt battery or a fuel cell. In that case, the e-vaping device 60 may be usable until the energy in the power supply 1 is depleted or in the case of lithium polymer battery, a minimum voltage cut-off level is achieved.

Further, the power supply 1 may be rechargeable and may include circuitry allowing the battery to be chargeable by an external charging device. In that case, the circuitry, when charged, provides power for a desired (or, alternatively, predetermined) number of applications of negative pressure, after which the circuitry must be re-connected to an external charging device. To recharge the e-vaping device 60, an USB charger or other suitable charger assembly may be used.

Furthermore, the e-vaping device 60 may include a control circuit 55 including the negative pressure sensor 16. The negative pressure sensor 16 may be operable to sense an air pressure drop and initiate application of voltage from the power supply 1 to the heater 14. As shown in FIG. 2, the control circuit 55 can also include a heater activation light 48 operable to glow when the heater 14 is activated. The heater activation light 48 may include an LED and may be at a first end of the e-vaping device 60 so that the heater activation light 48 takes on the appearance of a burning coal during application of negative pressure. Moreover, the heater activation light 48 can be arranged to be visible to an adult vaper. In addition, the heater activation light 48 can be utilized for e-vaping system diagnostics or to indicate that recharging is in progress. The heater activation light 48 can also be configured such that the adult vaper can activate and/or deactivate the heater activation light 48 for privacy.

In addition, the at least one air inlet 45 may be located adjacent the negative pressure sensor 16, such that the negative pressure sensor 16 may sense air flow indicative of application of negative pressure and activates the power supply 1 and the heater activation light 48 to indicate that the heater 14 is working.

Further, the control circuit 55 may supply power to the heater 14 responsive to the negative pressure sensor 16. In one embedment, the control circuit 55 may include a maximum, time-period limiter. In another embodiment, the control circuit 55 may include a manually operable switch to initiate application of negative pressure. The time-period of the electric current supply to the heater 14 may be pre-set depending on the amount of pre-vapor formulation desired to be vaporized. In another example embodiment, the circuitry 55 may supply power to the heater 14 as long as the negative pressure sensor 16 detects a pressure drop.

When activated, the heater 14 may heat a portion of the wick 28 surrounded by the heater for less than about 10 seconds, more preferably less than about 7 seconds. Thus, the power cycle (or maximum negative pressure application length) can range in period from about 2 seconds to about 10 seconds (e.g., about 3 seconds to about 9 seconds, about 4 seconds to about 8 seconds or about 5 seconds to about 7 seconds).

Figure 6A:
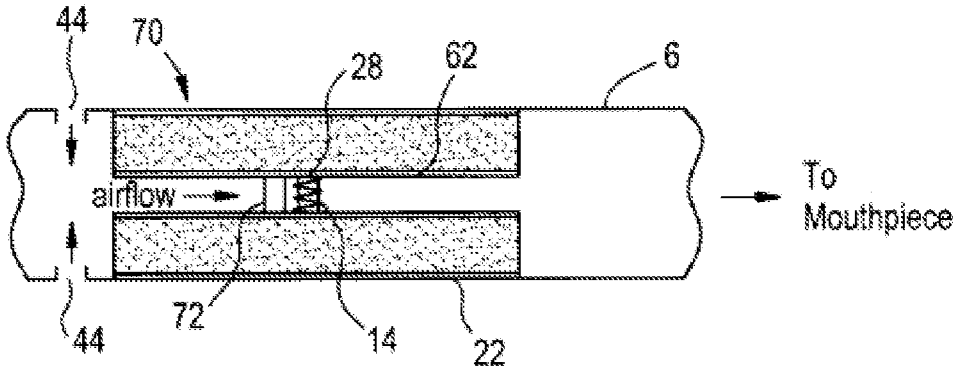
FIG. 6A is a schematic view of an inner tube with an airflow diverter prior to a heater-wick assembly according to one example embodiment.

FIG. 6A is a schematic view of an inner tube with an airflow diverter prior to a heater-wick assembly according to one example embodiment.

Referring to FIG. 6A, the first section 70 may include the air inlet 44 positioned at an end of the heater 14. It should be appreciated that more than one air inlet 44 is located at different locations along the outer tube 6. In an example embodiment, there may be two air inlets 44 located in opposite direction of the outer tube 6. Alternatively, there may be three, four, five or more air inlets 44. It should be appreciated that altering the size and number of air inlets 44 can also aid in establishing the resistance to draw of the e-vaping device 60.

As shown in FIG. 2, the air inlet 44 communicates with the mouth-end insert 8 such that application of negative pressure upon the mouth-end insert 8 activates the negative pressure sensor 16. The air from the air inlet 44 may flow to the central air passage 20 in the seal 15 and/or to other portions of the inner tube 62 and/or outer tube 6.

Referring back to FIG. 6A, the air may then flow toward the heater 14. The heater 14 may be arranged to communicate with the wick 28 and to heat the pre-vapor formulation contained in the wick 28 to a temperature sufficient to vaporize the pre-vapor formulation and form a vapor. Prior to the air reaching the heater 14, an airflow diverter 72 may be located upstream on the opposite side of the heater 14 from the mouth-end insert 8. The airflow diverter 72 may be operable to manage air flow at or around the heater 14 so as to abate a tendency of drawn air to cool the heater 14, which could otherwise lead to diminished vapor output. In addition, reducing the air flow passing over the heater 14 may reduce the vapor temperature and/or reduce the harshness of the vapor by diminishing the vapor phase nicotine content.

In use, during application of negative pressure to the mouth-end piece 8, the airflow diverter 72 may be operable to divert air flow away from a central portion of the inner tube 62 (or away from the heater 14) so as to counteract the tendency of the airflow to cool the heater 14 as a result of a strong or prolonged application of negative pressure. Hence, the heater 14 is substantially prevented from cooling during heating cycles so as to suppress and/or prevent a drop in an amount of vapor produced during application of negative pressure to the mouth-end piece 8.

Figure 6B:
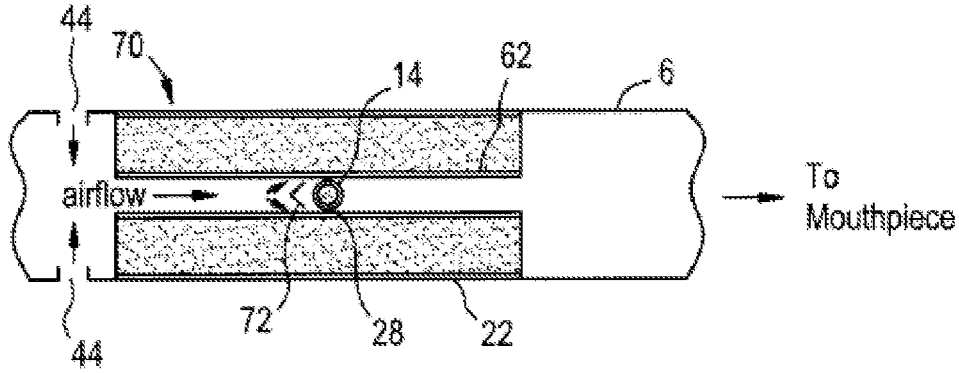
FIG. 6B is a cross-sectional view of FIG. 6A according to one example embodiment.
Figure 6C:
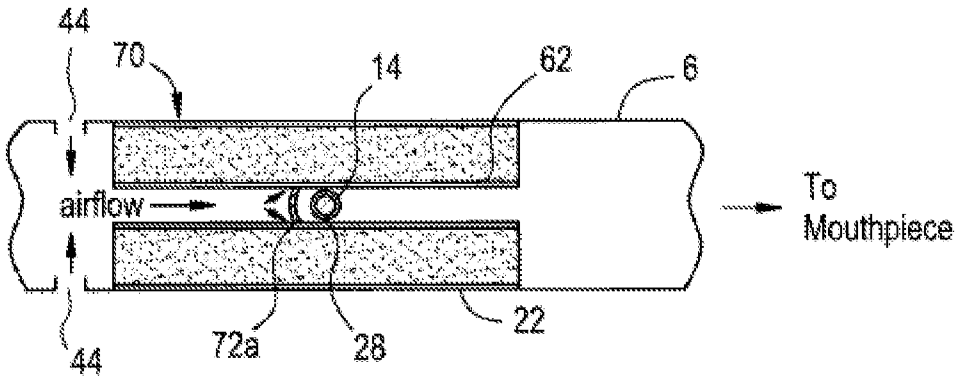
FIG. 6C is a schematic view of an inner tube with an airflow diverter prior to a heater-wick assembly according to another example embodiment.

In an example embodiment, the airflow diverter 72 may be V-shaped (as shown in FIG. 6B) in a cross-section along a longitudinal axis of the e-vapor device 6 to direct the air around the heater 14 (e.g., non-centrally or radially away from a centralized location of the heater 14). In other words, the airflow diverter 72 may be V-shaped to channel the air towards a wall of the inner tube 62. In an alternative example embodiment, the airflow diverter 72*a* may be C-shaped (as shown in FIG. 6C) in a cross-section along a longitudinal axis of the e-vapor device 6. It should be appreciated that other shapes of the diverter may be employed as long as all of the air does not pass over the heater 14.

It should further be appreciated that the size of the airflow diverter 72 may be adjusted to control the resistance to draw of the e-vaping device 60. More specifically, the size of the airflow diverter 72 may channel the air flow by controlling the air flow velocity (e.g., speed and/or the direction of the air flow). For example, the airflow diverter 72 may direct air flow in a particular direction and/or control the speed of the air flow. The air flow speed may be controlled by varying the cross sectional area of the air flow route. One skilled in the art would appreciate that air flow through a constricted section increases in speed while air flow through a wider section decreases speed.

Figure 7:
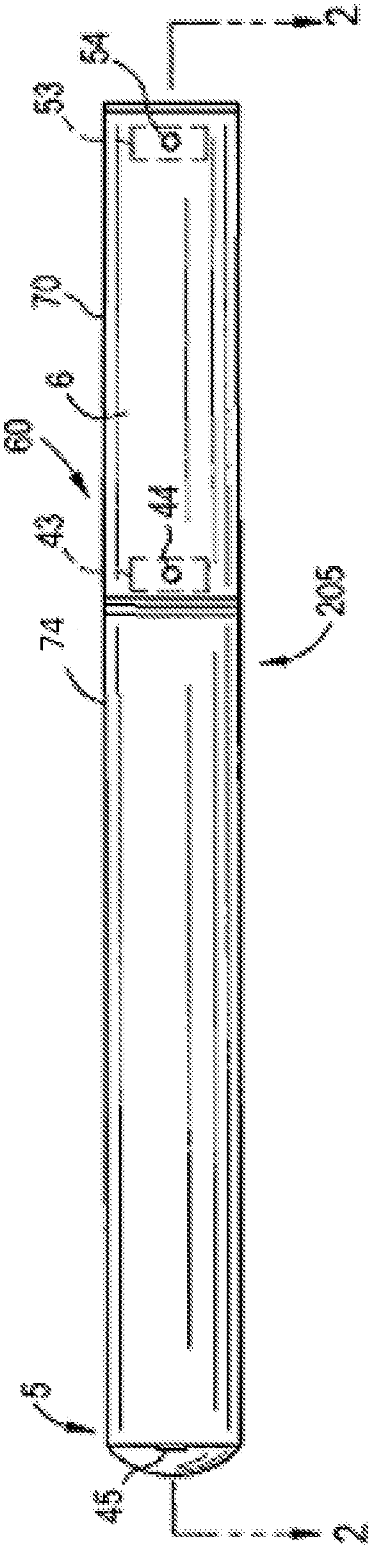
FIG. 7 is a planar view of an e-vaping device according to another example embodiment.
Figure 8:
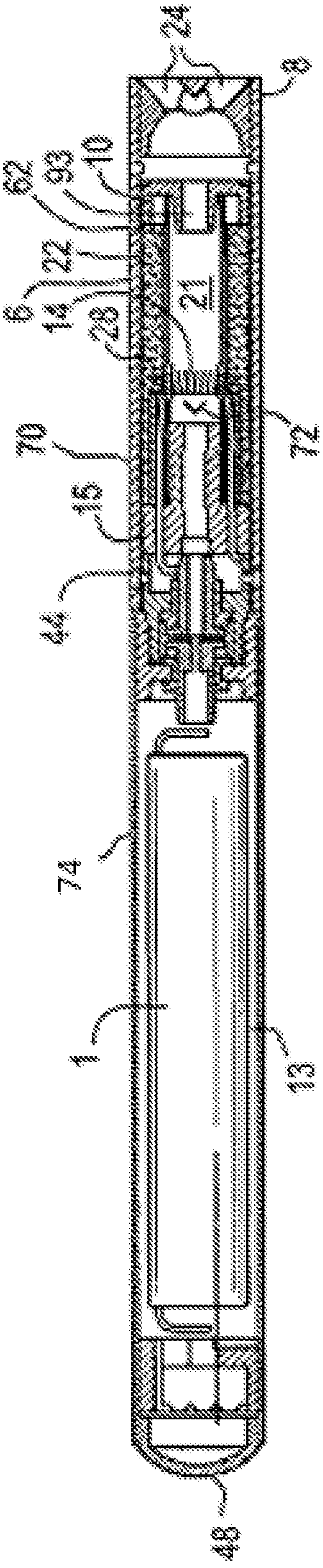
FIG. 8 is a side cross-sectional view of the e-vaping device shown in FIG. 7.

Referring now to FIGS. 7 and 8, an e-vaping device according to another example embodiment is shown.

Referring to FIG. 7, the first section 70 may include the air inlet 44 positioned at a first end of the heater 14 to establish the resistance to draw of the e-vaping device 60. More specifically, the air inlet 44 may be positioned near the seal 15. It should be appreciated that more than one air inlet 44 may be located at different locations along the outer tube 6.

Further, the first section 70 may also include an air inlet 54 at a second end of the heater 14. More specifically, the air inlet 54 may be located near the mouth-end piece 8. It should be appreciated that more than one air inlet 54 may be located at different locations along the outer tube 6.

The air inlet 54 may divide the air flow through the first section 70 of the e-vaping device 60 so that only a portion of the air will pass over the heater 14 via the diverter 72 while the other portion will be introduced at an end of vapor. Hence, less energy is required to vaporize the pre-vapor formulation, and reduce the vapor temperature so as to affect the content of the vapor (i.e., harshness).

Figure 9A:
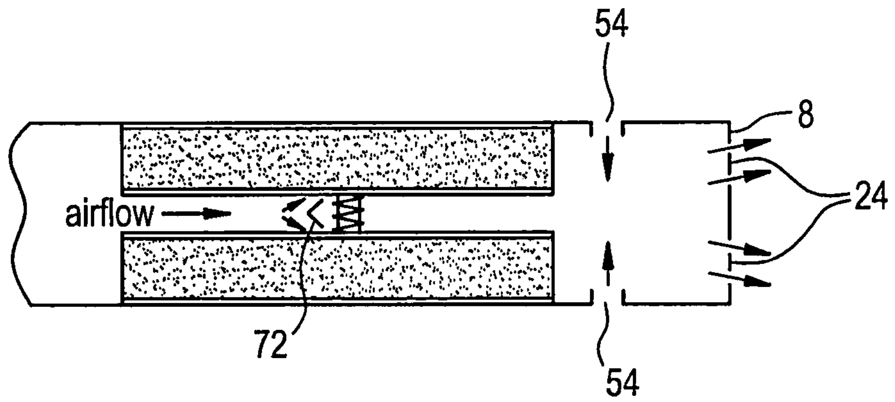
FIG. 9A is a schematic view of an inner tube with a heater-wick assembly and air inlet ports according to one example embodiment.

Referring to FIG. 9A, the air introduced into the air inlet 54 may transversely enter the e-vaping device 60 and then into the diverging outlet passages 24 of the mouth-end piece 8. In other words, air entering into the air inlet 54 and into the e-vaping device 60 may be at substantially 90 degrees.

Figure 9B:
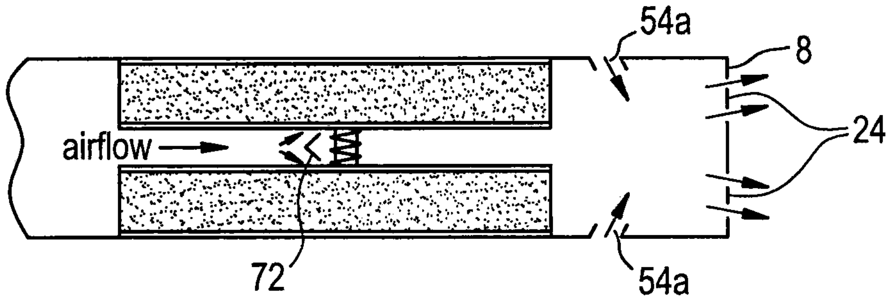
FIG. 9B is a schematic view of an inner tube with a heater-wick assembly and air inlet ports according to another example embodiment.

Referring to FIG. 9B, the air introduced into the air inlet 54 may enter the e-vaping device 60 at an angle and then into the diverging outlet passages 24 of the mouth-end piece 8. In other words, air entering into the air inlet 54 and into the e-vaping device 60 may be at substantially 45 degrees.

Referring back to FIG. 7, the air inlet 54 may be formed with a plate fixture 53 if other material is desired for the outer tube 6 (such as plastic for presenting a softer feel). The plate fixture 53 may be located at the air inlet 54 so as to maintain the precision of the air inlet 54. The plate fixture 53 may be made from metal, for example.

Figure 10:
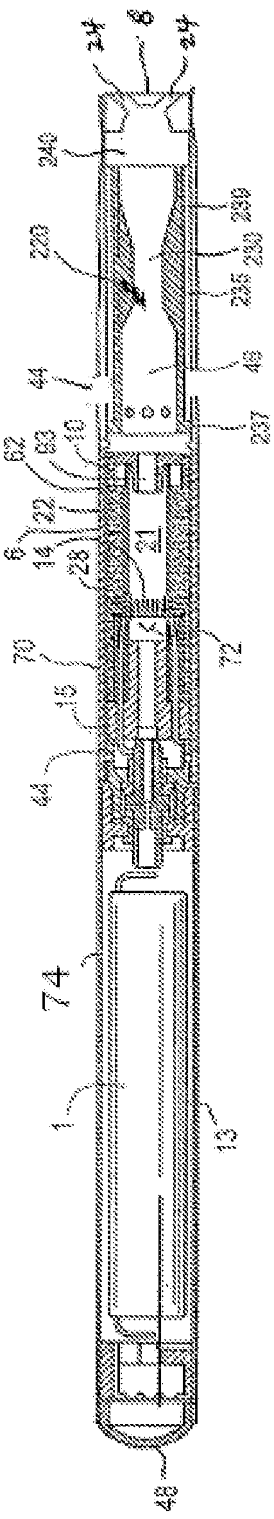
FIG. 10 is a planar view of an e-vaping device according to another example embodiment.
Figure 11:
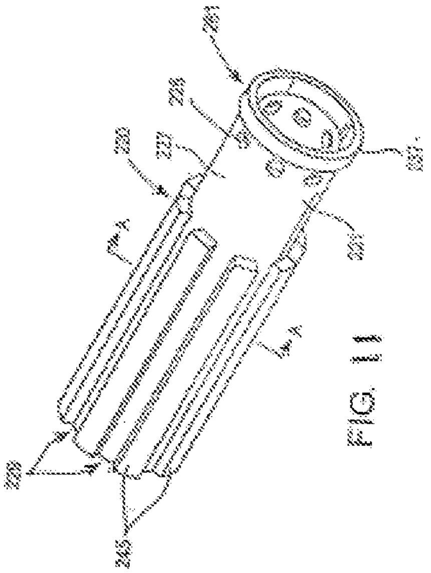
FIG. 11 is a cross-sectional view of a sheath flow device shown in FIG. 10.

Referring now to FIGS. 10 and 11, an e-vaping device according to another example embodiment is shown.

Referring to FIG. 10, the first section 70 may include the air inlets 44 positioned at a first end of the heater 14. The air inlets 44 may be near an end 281 of a sheath flow and dispersion promoter insert 220, as shown in FIG. 11. In other example embodiments, the air inlets 44 ("sheath air") may be superposed with the sheath flow and dispersion promoter insert 220. Optionally, air holes 225 in a wall 227 of the sheath flow and dispersion promoter insert 220 (shown in FIG. 11), may allow some air to enter the mixing chamber 46 of the sheath flow and dispersion promoter insert 220. In addition to the air holes 225, the sheath flow and dispersion promoter insert 220 may include a lip portion 237 at an upstream end thereof, which prevents passage of air.

As shown in FIG. 11, air that enters via the air inlets 44 can flow along an external surface of the sheath flow and dispersion promoter insert 220 via channels 229 extending longitudinally along the external surface of the sheath flow and dispersion promoter insert 220 between vanes 245. The vanes 245 may extend longitudinally along an outer surface 221 of the sheath flow and dispersion promoter insert 220 and in spaced apart relation so as to form the channels 229 therebetween. Once the dispersion passes through a constriction 230 in the sheath flow and dispersion promoter insert 220, as shown in FIG. 10, the dispersion may enter a downstream growth cavity 240 where the dispersion can mix with sheath air and the sheath air can act as a barrier between an inner surface of the growth cavity 240 and the dispersion so as to minimize condensation of the dispersion on walls of the growth cavity 240.

In a preferred example embodiment, the at least one air inlet 44 includes one or two air inlets. Alternatively, there may be three, four, five or more air inlets. Altering the size and number of air inlets 44 can also aid in establishing the resistance to draw of the e-vaping device 60. Preferably, the air inlets 44 communicate with the channels 229 arranged between the sheath flow and dispersion promoter insert 220 and the inner surface 231 of the outer casing 22.

In a preferred example embodiment, the sheath flow and dispersion promoter insert 220 may be operable to provide a dispersion that has a mass median particle diameter of less than 1 micron and aerosol delivery rates of at least about 0.01 mg/cm$^3$, for example. Once the dispersion is formed at the heater, the dispersion may pass to the mixing chamber 46 where the dispersion mixes with sheath air and is cooled. The sheath air causes the dispersion to supersaturate and nucleate to form new particles. The faster the dispersion is cooled the smaller the final diameter of the aerosol particles. When air is limited, the dispersion will not cool as fast and the particles will be larger. Moreover, the dispersion may condense on surfaces of the electronic smoking article resulting in lower delivery rates. The sheath flow and dispersion promoter insert 220 prevents or at least abates the tendency of the dispersion to condense on surfaces of the electronic smoking article and quickly cools the dispersion so as to produce a small particle size and high delivery rates as compared to e-vaping devices not including the sheath flow and dispersion promoter insert as described herein.

Accordingly, the sheath flow and dispersion promoter insert 220 may include a mixing chamber 46 adjacent to an upstream end of the sheath flow and dispersion promoter insert 220 or inside the sheath flow and dispersion promoter insert 220. The mixing chamber 46 may lead to the constriction 230 having a reduced diameter as compared to the mixing chamber 46. In an example embodiment, the diameter of the constriction 230 may be about 0.125 inch to about 0.1875 inch and may be about 0.25 inch to about 0.5 inch long. The constriction 230 may lead to the growth cavity 240 which is preferably about 2 inches in length and has a diameter of about 0.3125 inch. In a further example embodiment, the sheath flow and dispersion promoter insert 220 may be spaced about 0.2 to about 0.4 inch from the outlet 63 of the capillary 18. Moreover, the channels 229 formed on the outer surface 221 of the sheath flow and dispersion promoter insert 220 may form about 10% of the total cross-sectional area of the sheath flow and dispersion promoter insert 220 and may allow sheath air to pass between the outer surface 221 of the sheath flow and dispersion promoter insert 220 and the inner surface 231 of the outer cylindrical casing 22.

In an example embodiment, the first section 70 may be replaceable. In other words, once the pre-vapor formulation of the cartridge is depleted, only the first section 70 may be replaced. An alternate arrangement may include an embodiment where the entire e-vaping device 60 may be disposed of (or thrown away) once the pre-vapor formulation supply is depleted.

In another example embodiment, the e-vaping device 60 may be formed as a single section or uni-body. In other words, the first section 70 and the second section 80 of the e-vaping device 60 may not be removeably connected.

In an example embodiment, the e-vaping device 60 may be about 80 mm to about 110 mm long, preferably about 80 mm to about 100 mm long and about 7 mm to about 8 mm in diameter. For example, in one example embodiment, the e-vaping device may be about 84 mm long and may have a diameter of about 7.8 mm.

It should further be appreciated that at least one adhesive-backed label may be applied to the outer tube 6. The label may completely circumscribe the e-vaping device 60 and can be colored and/or textured. The label may further include holes therein which are sized and positioned so as to prevent blocking of the air inlets 44.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of manufacturing a cartridge, the method comprising:

placing a pre-vapor formulation reservoir in a housing, the pre-vapor formulation reservoir configured to store a pre-vapor formulation;

placing a vaporizer in the housing, the vaporizer configured to vaporize the pre-vapor formulation, the vaporizer including a heater and a wick, the wick being in fluid communication with the pre-vapor formulation reservoir, the heater configured to vaporize at least a portion of the pre-vapor formulation in the wick to form a vapor, and the heater positioned in a transverse direction in the housing; and placing an airflow diverter in the housing, the airflow diverter configured to divert air around an outer edge of the airflow diverter and away from a central region of the heater, the airflow diverter positioned on an opposite side of the heater relative to a mouth-end portion, the airflow diverter including a convex surface or an acute-angled surface opposite the heater, and the airflow diverter being orifice free.

2. The method of claim 1, wherein the airflow diverter and heater are spaced apart from each other along a longitudinal axis of the housing, and in the airflow diverter, the convex surface or the acute-angled surface opposite the heater is either the convex surface of the airflow diverter facing away from the heater in the longitudinal direction or the acute-angled surface of the airflow diverter having a vertex defining an acute angle and positioned such that the vertex points away from the heater in the longitudinal direction.

3. The method of claim 1, further comprising:

placing a gasket in the housing, the gasket positioned on the opposite side of the heater relative to the mouth-end portion; and placing an inner tube in the housing, the inner tube being fitted on the gasket, wherein the airflow diverter is V-shaped or C-shaped in a cross-section along a longitudinal axis of the housing.

4. The method according to claim 1, wherein the airflow diverter is substantially V-shaped in a cross-section along a longitudinal axis of the housing.

5. The method according to claim 1, wherein the airflow diverter is substantially C-shaped in a cross-section along a longitudinal axis of the housing.

6. The method according to claim 1, further comprising:

placing an inner tube in the housing, the inner tube including a pair of opposing slots, and positioning the inner tube so an end portion of the vaporizer extends through one opposing slot in the pair of opposing slots.

7. The method according to claim 6, wherein the airflow diverter diverts air outwardly towards the inner tube.

8. The method according to claim 6, wherein the housing includes at least one air inlet located on an outer surface of the housing.

9. The method according to claim 8, wherein the at least one air inlet is near the mouth-end portion.

10. The method according to claim 8, wherein the at least one air inlet is at an end of the pre-vapor formulation reservoir closest to the mouth-end portion.

11. The method according to claim 8, wherein the at least one air inlet is disposed transversely in relation to the mouth-end portion.

12. The method according to claim 8, wherein the at least one air inlet is disposed at an angle in relation to the mouth-end portion.

13. The method according to claim 12, wherein the at least one air inlet is disposed at a 45 degree angle.

14. A method of manufacturing an e-vaping device, the method comprising:

forming the cartridge according to the method of claim 1; and connecting a power supply to the heater, the power supply being configured to supply power to the heater.

15. The method of claim 14, further comprising:

coupling a power section to the cartridge, wherein the power supply is in the power section, and the coupling the power section to the cartridge includes connecting the power supply to the heater.

16. The method of claim 15, wherein the power section includes a puff sensor.

17. The method of claim 15, wherein the power section includes a control circuit.

18. A method of manufacturing an e-vaping device, the method comprising:

placing a pre-vapor formulation reservoir in a housing, the pre-vapor formulation reservoir configured to store a pre-vapor formulation;

placing a vaporizer in the housing, the vaporizer configured to vaporize the pre-vapor formulation, the vaporizer including a heater and a wick, the wick being in fluid communication with the pre-vapor formulation reservoir, the heater configured to vaporize at least a portion of the pre-vapor formulation in the wick to form a vapor, and the heater positioned in a transverse direction in the housing; and placing an airflow diverter in the housing, the airflow diverter configured to divert air around an outer edge of the airflow diverter and away from a central region of the heater, the airflow diverter positioned on an opposite side of the heater relative to a mouth-end portion, the airflow diverter including a convex surface or an acute-angled surface opposite the heater, and the airflow diverter being orifice free; and connecting a power supply to the heater, the power supply in the housing, and the power supply being configured to supply power to the heater.

19. The method of claim 18, the airflow diverter and heater are spaced apart from each other along a longitudinal axis of the housing, and in the airflow diverter, the convex surface or the acute-angled surface opposite the heater is either the convex surface of the airflow diverter facing away from the heater in the longitudinal direction or the acute-angled surface of the airflow diverter having a vertex defining an acute angle and positioned such that the vertex points away from the heater in the longitudinal direction.

20. The method of claim 18, further comprising:

placing a gasket in the housing, the gasket positioned on the opposite side of the heater relative to the mouth-end portion; and placing an inner tube in the housing, the inner tube being fitted on the gasket, wherein the airflow diverter is V-shaped or C-shaped in a cross-section along a longitudinal axis of the housing.

* * * * *